(12) United States Patent
Mallick et al.

(10) Patent No.: US 11,550,511 B2
(45) Date of Patent: Jan. 10, 2023

(54) WRITE PRESSURE THROTTLING BASED ON SERVICE LEVEL OBJECTIVES

(71) Applicant: EMC IP Holding Company LLC, Hopkinton, MA (US)

(72) Inventors: Sanjib Mallick, Bangalore (IN); Vinay G. Rao, Bangalore (IN); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 76 days.

(21) Appl. No.: 17/326,452

(22) Filed: May 21, 2021

(65) Prior Publication Data

US 2022/0374167 A1 Nov. 24, 2022

(51) Int. Cl.
*G06F 3/06* (2006.01)

(52) U.S. Cl.
CPC ............ *G06F 3/0659* (2013.01); *G06F 3/061* (2013.01); *G06F 3/0673* (2013.01)

(58) Field of Classification Search
CPC ....... G06F 3/0659; G06F 3/061; G06F 3/0673
See application file for complete search history.

(56) References Cited

U.S. PATENT DOCUMENTS

| | | |
|---|---|---|
| 6,567,397 B1 | 5/2003 | Campana et al. |
| 6,687,746 B1 | 2/2004 | Shuster et al. |
| 6,697,875 B1 | 2/2004 | Wilson |
| 7,275,103 B1 | 9/2007 | Thrasher et al. |
| 7,454,437 B1 | 11/2008 | Lavallee et al. |
| 7,617,292 B2 | 11/2009 | Moore et al. |

(Continued)

FOREIGN PATENT DOCUMENTS

| | | |
|---|---|---|
| CN | 103677927 B | 2/2017 |
| EP | 1117028 A2 | 7/2001 |

(Continued)

OTHER PUBLICATIONS

Mace, J., Bodik, P., Fonseca, R. and Musuvathi, M., 2015. Retro: Targeted resource management in multi-tenant distributed systems. In 12th USENIX Symposium on Networked Systems Design and Implementation (NSDI 15) (pp. 589-603).*

(Continued)

*Primary Examiner* — Tracy A Warren
(74) *Attorney, Agent, or Firm* — Ryan, Mason & Lewis, LLP

(57) ABSTRACT

An apparatus comprises at least one processing device. The at least one processing device is configured to detect a write pressure condition by identifying at least a first set of one or more logical storage devices having a first service level objective for which at least one performance metric has a value that exceeds a specified threshold, and responsive to the detected write pressure condition, to identify at least a second set of one or more logical storage devices, having a second service level objective that is lower than the first service level objective, and that are contributing to the detected write pressure condition. The at least one processing device is further configured, for each of the identified logical storage devices of the second set, to provide a write pressure indication to control throttling of write operations directed to that logical storage device of the second set.

20 Claims, 4 Drawing Sheets

(56) References Cited

U.S. PATENT DOCUMENTS

| | | |
|---|---|---|
| 7,668,981 B1 | 2/2010 | Nagineni et al. |
| 7,770,053 B1 | 8/2010 | Bappe et al. |
| 7,809,912 B1 | 10/2010 | Raizen et al. |
| 7,818,428 B1 | 10/2010 | Lavallee et al. |
| 7,890,664 B1 | 2/2011 | Tao et al. |
| 7,904,681 B1 | 3/2011 | Bappe et al. |
| 7,925,872 B2 | 4/2011 | Lai et al. |
| 8,250,256 B2 | 8/2012 | Ghosalkar et al. |
| 8,285,825 B1 | 10/2012 | Nagaraj et al. |
| 8,417,817 B1 | 4/2013 | Jacobs |
| 8,732,342 B1 | 5/2014 | Clark et al. |
| 8,825,919 B1 | 9/2014 | Lim et al. |
| 8,832,334 B2 | 9/2014 | Okita |
| 8,874,746 B1 | 10/2014 | Gonzalez |
| 9,026,694 B1 | 5/2015 | Davidson et al. |
| 9,122,503 B1 | 9/2015 | Hoff |
| 9,201,803 B1 | 12/2015 | Derbeko et al. |
| 9,258,242 B1* | 2/2016 | Mallick ............... H04L 43/0888 |
| 9,400,611 B1 | 7/2016 | Raizen |
| 9,417,907 B1 | 8/2016 | Dire et al. |
| 9,430,368 B1 | 8/2016 | Derbeko et al. |
| 9,594,780 B1 | 3/2017 | Esposito et al. |
| 9,647,933 B1 | 5/2017 | Tawri et al. |
| 9,672,160 B1 | 6/2017 | Derbeko et al. |
| 9,778,852 B1 | 10/2017 | Marshak et al. |
| 9,965,218 B1* | 5/2018 | Martin ................ G06F 3/0649 |
| 10,228,868 B1 | 3/2019 | Liang et al. |
| 10,270,794 B1 | 4/2019 | Mukerji et al. |
| 10,282,107 B1* | 5/2019 | Martin ................ G06F 3/0689 |
| 10,289,325 B1 | 5/2019 | Bono |
| 10,346,076 B1 | 7/2019 | Jonnala et al. |
| 10,353,714 B1 | 7/2019 | Gokam et al. |
| 10,439,878 B1 | 10/2019 | Tah et al. |
| 10,474,367 B1 | 11/2019 | Mallick et al. |
| 10,474,383 B1 | 11/2019 | Wang et al. |
| 10,476,960 B1 | 11/2019 | Rao et al. |
| 10,496,282 B1 | 12/2019 | Martin et al. |
| 10,521,369 B1 | 12/2019 | Mallick et al. |
| 10,606,496 B1 | 3/2020 | Mallick et al. |
| 10,637,917 B2 | 4/2020 | Mallick et al. |
| 10,652,206 B1 | 5/2020 | Pusalkar et al. |
| 10,659,371 B1 | 5/2020 | Jain et al. |
| 10,728,166 B2 | 7/2020 | Balakrishnan et al. |
| 10,754,572 B2 | 8/2020 | Kumar et al. |
| 10,757,189 B2 | 8/2020 | Mallick et al. |
| 10,764,371 B2 | 9/2020 | Rao et al. |
| 10,789,006 B1 | 9/2020 | Gokam et al. |
| 10,817,181 B2 | 10/2020 | Mallick et al. |
| 10,838,648 B2 | 11/2020 | Sharma et al. |
| 10,880,217 B2 | 12/2020 | Mallick et al. |
| 10,884,935 B1 | 1/2021 | Doddaiah |
| 10,911,402 B2 | 2/2021 | Pusalkar et al. |
| 11,012,512 B1 | 5/2021 | Mallick et al. |
| 2002/0023151 A1 | 2/2002 | Iwatani |
| 2002/0103923 A1 | 8/2002 | Cherian et al. |
| 2004/0010563 A1 | 1/2004 | Forte et al. |
| 2004/0236846 A1* | 11/2004 | Alvarez ................ H04L 9/40 709/223 |
| 2006/0026346 A1 | 2/2006 | Kadoiri et al. |
| 2006/0277383 A1 | 12/2006 | Hayden et al. |
| 2007/0174849 A1 | 7/2007 | Cheung et al. |
| 2008/0043973 A1 | 2/2008 | Lai et al. |
| 2008/0201458 A1 | 8/2008 | Salil |
| 2008/0301332 A1 | 12/2008 | Butler et al. |
| 2009/0248917 A1 | 10/2009 | Kalos et al. |
| 2009/0259749 A1 | 10/2009 | Barrett et al. |
| 2010/0313063 A1 | 12/2010 | Venkataraja et al. |
| 2011/0197027 A1 | 8/2011 | Balasubramanian et al. |
| 2011/0296230 A1 | 12/2011 | Chen et al. |
| 2012/0102369 A1 | 4/2012 | Hiltunen et al. |
| 2012/0246345 A1 | 9/2012 | Contreras et al. |
| 2013/0086302 A1* | 4/2013 | Tressler ............... G06F 3/0688 711/E12.008 |
| 2013/0117766 A1 | 5/2013 | Bax et al. |
| 2013/0339551 A1 | 12/2013 | Flanagan et al. |
| 2014/0105068 A1 | 4/2014 | Xu |
| 2015/0067271 A1 | 3/2015 | Camp et al. |
| 2015/0143019 A1* | 5/2015 | Sankar ................ G06F 3/0653 711/102 |
| 2015/0222705 A1 | 8/2015 | Stephens |
| 2015/0242134 A1 | 8/2015 | Takada et al. |
| 2016/0092136 A1 | 3/2016 | Balakrishnan et al. |
| 2016/0117113 A1 | 4/2016 | Li et al. |
| 2016/0313944 A1 | 10/2016 | Hodgdon et al. |
| 2016/0335003 A1 | 11/2016 | Ahmed et al. |
| 2017/0235507 A1 | 8/2017 | Sinha et al. |
| 2017/0317991 A1 | 11/2017 | Lionetti |
| 2018/0121366 A1 | 5/2018 | Tian |
| 2018/0173464 A1 | 6/2018 | Wongso et al. |
| 2018/0189635 A1 | 7/2018 | Olarig et al. |
| 2018/0210664 A1 | 7/2018 | Weissbrem |
| 2018/0253256 A1 | 9/2018 | Bharadwaj |
| 2018/0284997 A1 | 10/2018 | Dalmatov |
| 2018/0288155 A1 | 10/2018 | Zhou et al. |
| 2018/0317101 A1 | 11/2018 | Koue |
| 2019/0095299 A1 | 3/2019 | Liu et al. |
| 2019/0104015 A1 | 4/2019 | Moore et al. |
| 2019/0108888 A1 | 4/2019 | Sarkar et al. |
| 2019/0155532 A1* | 5/2019 | Takakura ............ G06F 11/3433 |
| 2019/0205203 A1 | 7/2019 | Hwang et al. |
| 2019/0207873 A1 | 7/2019 | Kasheff et al. |
| 2019/0303308 A1 | 10/2019 | Knauft et al. |
| 2019/0334987 A1 | 10/2019 | Mallick et al. |
| 2020/0021653 A1 | 1/2020 | Rao et al. |
| 2020/0036604 A1 | 1/2020 | Kalman et al. |
| 2020/0045131 A1 | 2/2020 | Nigam et al. |
| 2020/0097203 A1 | 3/2020 | Mallick et al. |
| 2020/0106698 A1 | 4/2020 | Rao et al. |
| 2020/0110552 A1 | 4/2020 | Kumar et al. |
| 2020/0112608 A1 | 4/2020 | Patel et al. |
| 2020/0192588 A1 | 6/2020 | Kumar et al. |
| 2020/0204475 A1 | 6/2020 | Mallick et al. |
| 2020/0204495 A1 | 6/2020 | Mallick et al. |
| 2020/0213274 A1 | 7/2020 | Pusalkar et al. |
| 2020/0241890 A1 | 7/2020 | Mallick et al. |
| 2020/0314218 A1 | 10/2020 | Kumar et al. |
| 2020/0348860 A1 | 11/2020 | Mallick et al. |
| 2020/0348861 A1 | 11/2020 | Marappan et al. |
| 2020/0348869 A1 | 11/2020 | Gokam |
| 2020/0349094 A1 | 11/2020 | Smith et al. |
| 2020/0363985 A1 | 11/2020 | Gokam et al. |
| 2020/0372401 A1 | 11/2020 | Mallick et al. |
| 2021/0019054 A1 | 1/2021 | Anchi et al. |
| 2021/0026551 A1 | 1/2021 | Tidke et al. |
| 2021/0026650 A1 | 1/2021 | Rao et al. |

FOREIGN PATENT DOCUMENTS

| | | |
|---|---|---|
| EP | 2667569 A1 | 11/2013 |
| WO | PCT/US2019/052549 | 12/2019 |
| WO | PCT/US2019/053204 | 12/2019 |
| WO | PCT/US2019/053473 | 12/2019 |
| WO | PCT/US2019/067144 | 5/2020 |

OTHER PUBLICATIONS

Sehgal, P., Voruganti, K. and Sundaram, R., Apr. 2012. Slo-aware hybrid store. In 2012 IEEE 28th Symposium on Mass Storage Systems and Technologies (MSST) (pp. 1-6). IEEE.*

Wang, Z., Zhu, X. and Singhal, S., Oct. 2005. Utilization and SLO-based control for dynamic sizing of resource partitions. In International Workshop on Distributed Systems: Operations and Management (pp. 133-144). Springer, Berlin, Heidelberg.*

Wen, H., Cao, Z., Zhang, Y., Cao, X., Fan, Z., Voigt, D. and Du, D., Sep. 2018. Joins: Meeting latency slo with integrated control for networked storage. In 2018 IEEE 26th International Symposium on Modeling, Analysis, and Simulation of Computer and Telecommunication Systems (MASCOTS) (pp. 194-200). IEEE.*

Kris Piepho, "Dell EMC SC Series Storage: Microsoft Multipath I/O," Dell EMC Best Practices, Jan. 2017, 57 pages.

NVM Express, "NVM Express, Revision 1.3," NVM Express, May 1, 2017, 282 pages.

(56) References Cited

OTHER PUBLICATIONS

VMWARE, "Multipathing Configuration for Software iSCSI Using Port Binding," Technical White Paper, Apr. 25, 2012, 15 pages.
Dell EMC, "Dell EMC SC Series Storage: Microsoft Multipath I/O," Dell EMC Engineering, Jun. 2017, 56 pages.
Dell EMC, "Dell EMC PowerPath Family: PowerPath and PowerPath/VE Multipathing," Data Sheet, 2017, 3 pages.
EMC, "EMC PowerPath and PowerPath/VE Family for Windows," Installation and Administration Guide, Oct. 2018, 102 pages.
EMC, "EMC Powerpath Load Balancing and Failover", Comparison with native MPIO operating system solutions, Feb. 2011, 28 pages.
Dell EMC, "PowerMax OS," Dell EMC PowerMax Family Product Guide, May 2019, 192 pages.
DELL EMC, "DELL EMC SC Series Storage and Microsoft Multipath I/O," CML 1004, Jul. 2018, 36 pages.
VMware, Inc. "VMware VMFS Volume Management," 2009, 8 pages.
Dell EMC, "Dell EMC Unity: Virtualization Integration," Technical White Paper, Oct. 2019, 39 pages.
Dell EMC, "Dell EMC PowerMax: iSCSI Implementation for Dell EMC Storage Arrays Running PowerMaxOS," Technical White Paper, Sep. 2019, 35 pages.
U.S. Appl. No. 16/697,393 filed in the name of Vinay G. Rao et al. filed Nov. 27, 2019, and entitled "Automated Seamless Migration of Logical Storage Devices.".
U.S. Appl. No. 16/710,828 filed in the name of Amit Pundalik Anchi et al. filed Dec. 11, 2019, and entitled "Automated Seamless Migration with Signature Issue Resolution.".

\* cited by examiner

WRITE PRESSURE INFORMATION MAINTAINED BY STORAGE ARRAY FOR LOGICAL STORAGE DEVICES

| LUN 1 | SLO LEVEL ID | PERFORMANCE MEASUREMENTS |
| --- | --- | --- |
| LUN 2 | SLO LEVEL ID | PERFORMANCE MEASUREMENTS |
| ... | | |
| LUN X | SLO LEVEL ID | PERFORMANCE MEASUREMENTS |

FIG. 4

WRITE PRESSURE THROTTLING BASED ON SERVICE LEVEL OBJECTIVES

FIELD

The field relates generally to information processing systems, and more particularly to storage in information processing systems.

BACKGROUND

Storage arrays and other types of storage systems are often shared by multiple host devices over a network. Applications running on the host devices each include one or more processes that perform the application functionality. The processes issue input-output (IO) operations directed to particular logical storage volumes or other logical storage devices, for delivery by the host devices over selected paths to storage ports of the storage system. Different ones of the host devices can run different applications with varying workloads and associated IO patterns. Such host devices also generate additional IO operations in performing various data services such as migration and replication. In many situations, the IO operations include bursts of write operations that are generated by one or more host devices and sent to the storage system, potentially overwhelming the limited IO queues and other resources that the storage system can allocate for the use of the individual host devices. For example, such bursts of write operations can occur when host devices run applications in-memory, and subsequently destage cached changes in batches. Write bursts in these and other situations can cause the storage system to frequently signal queue-full conditions back to the host devices, which can adversely impact the performance of the host devices.

SUMMARY

Illustrative embodiments provide techniques for detecting and alleviating write pressure conditions by leveraging service level objective (SLO) arrangements implemented by a storage array or other storage system. Such SLO-based arrangements in some embodiments facilitate the provision of automated write throttling that advantageously avoids the drawbacks of the conventional techniques described above.

In some embodiments, at least a portion of the automated write throttling functionality is implemented in at least one host driver, such as a multi-path input-output (MPIO) driver of a host device. Other types of host drivers can be used in place of or in addition to one or more MPIO drivers. For example, in some embodiments, at least a portion of the disclosed automated write throttling functionality is carried out using one or more iSCSI drivers, or other types of non-MPIO host drivers.

As indicated above, illustrative embodiments provide significant advantages over conventional practice. For example, these embodiments advantageously avoid the substantial negative host performance implications of excessive signaling of queue-full conditions in a storage array.

In one embodiment, an apparatus comprises at least one processing device that includes a processor and a memory, with the processor being coupled to the memory. The at least one processing device is configured to detect a write pressure condition by identifying at least a first set of one or more logical storage devices having a first SLO for which at least one performance metric has a value that exceeds a specified threshold, and responsive to the detected write pressure condition, to identify at least a second set of one or more logical storage devices, having a second SLO that is lower than the first SLO, and that are contributing to the detected write pressure condition. The at least one processing device is further configured, for each of the identified logical storage devices of the second set, to provide a write pressure indication to control throttling of write operations directed to that logical storage device of the second set.

The at least one processing device in some embodiments is illustratively implemented in a storage array or other type of storage system that includes the first and second sets of logical storage devices, although other arrangements are possible.

In some embodiments, the first SLO illustratively comprises a highest one of a plurality of SLOs supported by the storage system, and the second SLO illustratively comprises a lowest one of a plurality of SLOs supported by the storage system.

The performance metric in some embodiments comprises a response time metric for IO operations directed to the first set of one or more logical storage devices, although additional or alternative performance metrics can be used.

In some embodiments, identifying at least a second set of one or more logical storage devices comprises monitoring at least one of a write count, a write pending count and a bandwidth consumption for each of a plurality of logical storage devices having the second SLO, and responsive to detection of an above-threshold amount of increase in at least one of the write count, the write pending count and the bandwidth consumption for a given one of the logical storage device having the second SLO, including the given logical storage device in the second set.

Additionally or alternatively, in some embodiments, for each of the identified logical storage devices of the second set, providing a write pressure indication to control throttling of write operations directed to that logical storage device of the second set comprises receiving from a host device a write operation directed to the logical storage device of the second set, and issuing a check condition notification for the received write operation to the host device.

For example, issuing the check condition notification illustratively comprises issuing the check condition notification in conjunction with rejecting the received write operation. In some embodiments of this type, multiple write operations are received for the logical storage device of the second set, and rejecting the received write operation comprises selecting a particular one of the multiple write operations to reject based at least in part on an amount of data associated with that write operation.

The check condition notification in some embodiments causes the host device to at least temporarily reduce a rate at which write operations are directed to the logical storage device of the second set.

For example, at least temporarily reducing a rate at which the write operations are directed to the logical storage device of the second set illustratively comprises reducing the rate for a throttle-down period, and in conjunction with completion of the throttle-down period, determining if an additional check condition notification is received responsive to an additional write operation directed to the logical storage device of the second set, and continuing to reduce the rate responsive to receipt of the additional check condition notification.

In some embodiments, the at least one processing device is further configured to receive, in response to the check condition notification issued for a given logical storage device of the second set, a command requesting additional write pressure information for that logical storage device, and to provide, in response to the received command, an indication of a particular level of write pressure currently being experienced.

Additionally or alternatively, the at least one processing device in some embodiments is further configured to determine that the detected write pressure condition continues to persist subsequent to providing, for each of the identified logical storage devices of the second set, the write pressure indication to control throttling of write operations directed to that logical storage device of the second set, and responsive to the determining, to identify at least a third set of one or more logical storage devices having a third SLO that is lower than the first SLO but higher than the second SLO and that are contributing to the detected write pressure condition, and for each of the identified logical storage devices of the third set, to provide a write pressure indication to control throttling of write operations directed to that logical storage device of the third set.

In one or more embodiments, the at least one processing device is illustratively further configured to track a write pending diminish rate over multiple received write operations, and to delay providing the write pressure indication responsive to a given write operation by an amount of time that is determined based at least in part on a current value of the write pending diminish rate.

These and other illustrative embodiments include, without limitation, apparatus, systems, methods and computer program products comprising processor-readable storage media.

BRIEF DESCRIPTION OF THE DRAWINGS

FIG. 4 shows an example of write pressure information maintained by a storage system for use in automated write throttling in an illustrative embodiment.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
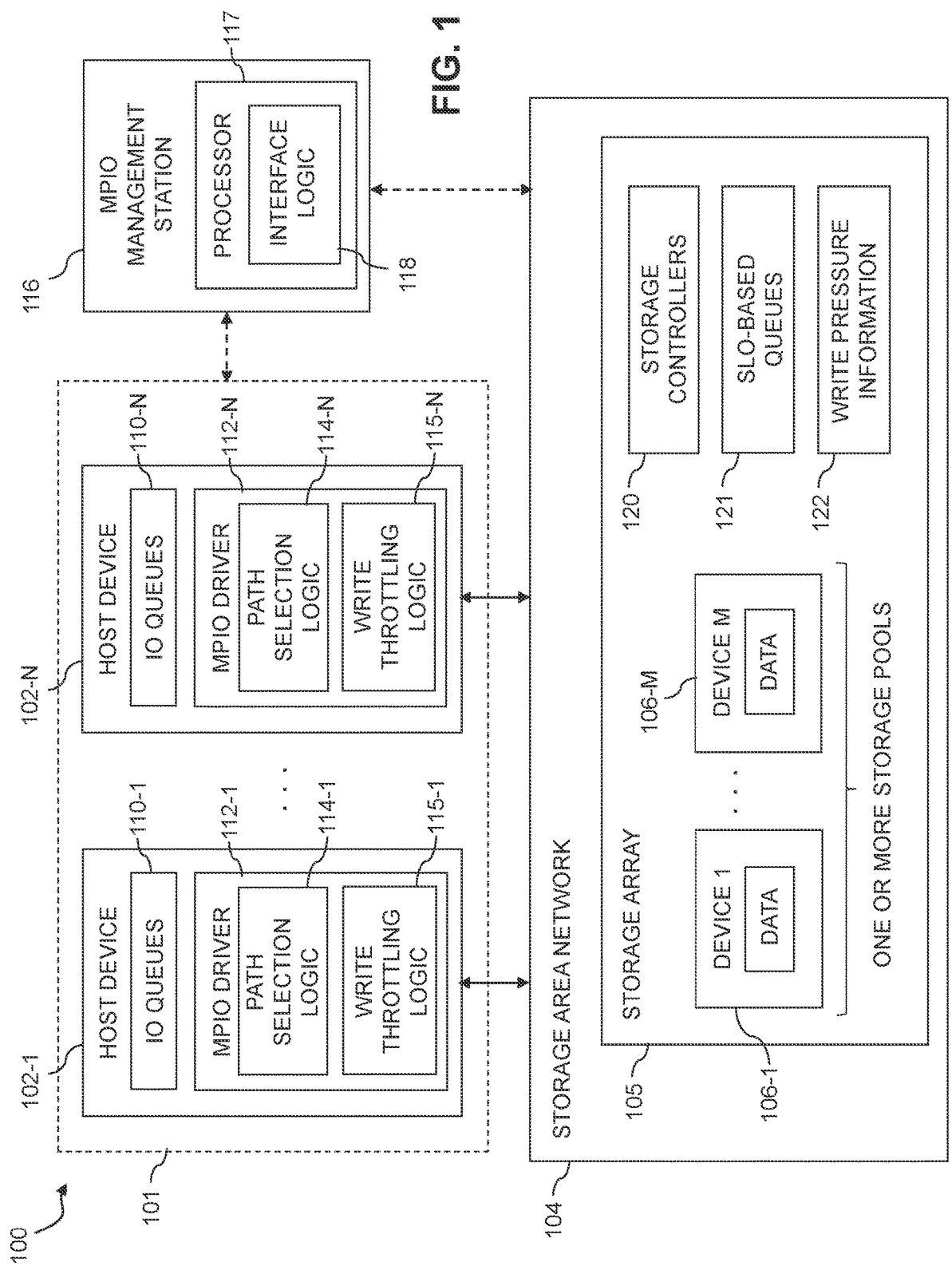
FIG. 1 is a block diagram of an information processing system configured with functionality for automated write throttling in a multi-path layer of a host device in an illustrative embodiment.

FIG. 1 shows an information processing system 100 configured in accordance with an illustrative embodiment. The information processing system 100 comprises a computer system 101 that includes a plurality of host devices 102-1, . . . 102-N. The host devices 102 communicate over a storage area network (SAN) 104 with at least one storage array 105. The storage array 105 comprises a plurality of storage devices 106-1, . . . 106-M each storing data utilized by one or more applications running on one or more of the host devices 102. The storage devices 106 are illustratively arranged in one or more storage pools. The storage array 105 and its associated storage devices 106 are an example of what is more generally referred to herein as a "storage system." This storage system in the present embodiment is shared by the host devices 102, and is therefore also referred to herein as a "shared storage system." Other embodiments can include only a single host device, possibly configured to have exclusive use of the storage system.

The host devices 102 illustratively comprise respective computers, servers or other types of processing devices capable of communicating with the storage array 105 of the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 106 of the storage array 105 of SAN 104 implement logical units (LUNs) configured to store objects for users associated with the host devices 102. These objects can comprise files, blocks or other types of objects. The host devices 102 interact with the storage array 105 utilizing read and write commands as well as other types of commands that are transmitted over the SAN 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple paths to the storage array 105, with at least one of the storage devices 106 of the storage array 105 being visible to that host device on a given one of the paths. A given one of the storage devices 106 may be accessible to the given host device over multiple paths.

Different ones of the storage devices 106 of the storage array 105 illustratively exhibit different latencies in processing of IO operations. In some cases, the same storage device may exhibit different latencies for different ones of multiple paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand (IB), Gigabit Ethernet or Fibre Channel (FC). Numerous alternative networking arrangements are possible in a given embodiment, as will be appreciated by those skilled in the art.

The host devices 102 comprise respective sets of IO queues 110-1, . . . 110-N and respective MPIO drivers 112-1, . . . 112-N. The MPIO drivers 112 collectively comprise a multi-path layer of the host devices 102. Path selection functionality for delivery of IO operations from the host devices 102 to the storage array 105 is provided in the multi-path layer by respective instances of path selection logic 114-1, . . . 114-N implemented within the MPIO drivers 112. The multi-path layer further provides functionality for automated write throttling. Such functionality is provided at least in part using respective instances of write throttling logic 115-1, . . . 115-N implemented within the MPIO drivers 112.

The MPIO drivers 112 may comprise, for example, otherwise conventional MPIO drivers, such as PowerPath® drivers from Dell EMC, suitably modified in the manner disclosed herein to provide functionality for automated write throttling. Other types of MPIO drivers from other driver vendors may be suitably modified to incorporate functionality for automated write throttling as disclosed herein.

The host devices 102 can include additional or alternative components. For example, in some embodiments, the host devices 102 comprise respective local caches, implemented using respective memories of those host devices. A given such local cache can be implemented using one or more cache cards, possibly implementing caching techniques such as those disclosed in U.S. Pat. Nos. 9,201,803, 9,430,368 and 9,672,160, each entitled "System and Method for Caching Data," and incorporated by reference herein. A wide variety of different caching techniques can be used in other embodiments, as will be appreciated by those skilled in the art. Other examples of memories of the respective host devices 102 that may be utilized to provide local caches include one or more memory cards or other memory devices, such as, for example, an NVMe over PCIe cache card, a local flash drive or other type of NVM storage drive, or combinations of these and other host memory devices.

The system 100 further comprises an MPIO management station 116 that includes a processor 117 implementing interface logic 118. The interface logic 118 is utilized to communicate with the host devices 102 and the storage array 105. Such an MPIO management station 116 provides management functionality for the multi-path layer comprising the MPIO drivers 112 of the host devices 102. In some embodiments, host device management software executing on the MPIO management station 116 interacts with storage array management software executing on the storage array 105.

The MPIO driver 112-1 is configured to deliver IO operations selected from its corresponding set of IO queues 110-1 to the storage array 105 via selected ones of multiple paths over the SAN 104. The sources of the IO operations stored in the set of IO queues 110-1 illustratively include respective processes of one or more applications executing on the host device 102-1. For example, IO operations can be generated by each of multiple processes of a database application running on the host device 102-1. Such processes issue IO operations for delivery to the storage array 105 over the SAN 104. Other types of sources of IO operations may be present in a given implementation of system 100.

A given IO operation is therefore illustratively generated by a process of an application running on the host device 102-1, and is queued in a given one of the IO queues 110-1 of the host device 102-1 with other operations generated by other processes of that application, and possibly other processes of other applications.

The paths from the host device 102-1 to the storage array 105 illustratively comprise paths associated with respective initiator-target pairs, with each initiator comprising a host bus adaptor (HBA) or other initiating entity of the host device 102-1 and each target comprising a port or other targeted entity corresponding to one or more of the storage devices 106 of the storage array 105. As noted above, the storage devices 106 illustratively comprise LUNs or other types of logical storage devices.

In some embodiments, the paths are associated with respective communication links between the host device 102-1 and the storage array 105 with each such communication link having a negotiated link speed. For example, in conjunction with registration of a given HBA to a switch of the SAN 104, the HBA and the switch may negotiate a link speed. The actual link speed that can be achieved in practice in some cases is less than the negotiated link speed, which is a theoretical maximum value.

Various scheduling algorithms, load balancing algorithms and/or other types of algorithms can be utilized by the WIPIO driver 112-1 in delivering IO operations from the IO queues 110-1 to the storage array 105 over particular paths via the SAN 104. Each such IO operation is assumed to comprise one or more commands for instructing the storage array 105 to perform particular types of storage-related functions such as reading data from or writing data to particular logical volumes of the storage array 105. Such commands are assumed to have various payload sizes associated therewith, and the payload associated with a given command is referred to herein as its "command payload."

A command directed by the host device 102-1 to the storage array 105 is considered an "outstanding" command until such time as its execution is completed in the viewpoint of the host device 102-1, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

In illustrative embodiments to be described below, it is assumed without limitation that the initiators of a plurality of initiator-target pairs comprise respective HBAs of the host device 102-1 and that the targets of the plurality of initiator-target pairs comprise respective ports of the storage array 105. Examples of such HBAs and storage array ports are illustrated in conjunction with the embodiment of FIG. 3.

Selecting a particular one of multiple available paths for delivery of a selected one of the IO operations of the set of IO queues 110-1 is more generally referred to herein as "path selection." Path selection as that term is broadly used herein can in some cases involve both selection of a particular IO operation and selection of one of multiple possible paths for accessing a corresponding logical device of the storage array 105. The corresponding logical device illustratively comprises a LUN or other logical storage volume to which the particular IO operation is directed.

It should be noted that paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from respective addition or deletion of at least a portion of the storage devices 106 of the storage array 105.

Addition or deletion of paths can also occur as a result of zoning and masking changes or other types of storage system reconfigurations performed by a storage administrator or other user. Some embodiments are configured to send a predetermined command from the host device 102-1 to the storage array 105, illustratively utilizing the MPIO driver 112-1, to determine if zoning and masking information has been changed. The predetermined command can comprise, for example, a log sense command, a mode sense command, a "vendor unique command" or VU command, or combinations of multiple instances of these or other commands, in an otherwise standardized command format.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well to discover the disappearance of any existing LUNs that have been deleted from the storage array 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible. The user-space portion of the MPIO driver 112-1 is illustratively associated with an Operating System (OS) kernel of the host device 102-1.

For each of one or more new paths identified in the path discovery scan, the host device 102-1 may be configured to execute a host registration operation for that path. The host registration operation for a given new path illustratively provides notification to the storage array 105 that the host device 102-1 has discovered the new path.

In the FIG. 1 embodiment, the storage array 105 comprises a plurality of storage controllers 120, one or more sets of SLO-based queues 121, and one or more instances of write pressure information 122.

The storage controllers 120 illustratively control the processing of IO operations received in the storage array 105 from the host devices 102. For example, the storage controllers 120 illustratively manage the processing of read and write commands directed by the MPIO drivers 112 to particular ones of the storage devices 106.

The SLO-based queues 121 illustratively comprise respective IO operation priority queues, and may be implemented as respective portions of a persistent memory of the storage array 105. The storage controllers 120 in some embodiments implement one or more response time control modules that are used to implement storage array based adjustments in response time for particular IO operations based at least in part on SLO information stored by the storage array 105 in its persistent memory. The response time control module is assumed to operate in conjunction with the SLO-based queues 121.

The storage array 105 illustratively utilizes its SLO-based queues 121 to provide different levels of performance for different IO operations. For example, the SLO-based queues 121 illustratively may have respective different SLO levels, such as Diamond, Gold, Silver and Bronze, in this example arranged from a highest SLO to a lowest SLO, with higher SLOs having better response times than lower SLOs. The storage array 105 may be configured to provide different SLOs for different ones of the IO operations by assigning different ones of the IO operations to different ones of the SLO-based queues 121. The SLO-based queues 121 are illustratively associated with respective SLOs for processing of IO operations in the storage array 105. Process tags may be used in assigning different ones of the IO operations to different ones of the SLO-based queues 121, as disclosed in U.S. Pat. No. 10,474,367, entitled "Storage System with Input-Output Performance Control Utilizing Application Process Detection," which is incorporated by reference herein. However, use of process tags is not required, and other techniques can be used to assign particular IO operations received in the storage array 105 to particular ones of the SLO-based queues 121.

The write pressure information 122 is illustratively maintained by the storage array 105 for respective LUNs or other logical storage devices, and can be arranged, for example, in the manner illustrated in the example of FIG. 4, or utilizing other types and arrangements of tables or other data structures.

It is assumed that the MPIO drivers 112 of the respective host devices 102 can read or otherwise obtain at least portions of the write pressure information 122 directly or indirectly from the storage array 105.

For example, at least portions of the write pressure information 122 can be obtained by the host device 102-1 from the storage array 105 utilizing an in-band communication mechanism in which one or more predetermined commands in a designated storage protocol are sent from the host device 102-1 to the storage array 105. Such predetermined commands can comprise, for example, a log sense command, a mode sense command, a "vendor unique command" or VU command, or combinations of multiple instances of these or other commands, in an otherwise standardized command format, such as a SCSI format or other type of format.

Additionally or alternatively, at least portions of the write pressure information 122 can be obtained by the host device 102-1 from the storage array 105 utilizing an out-of-band communication mechanism. For example, an out-of-band communication mechanism of this type can involve host management software of the host device 102-1 communicating with storage array management software of the storage array 105 over an IP network connection or other type of network connection. Such host management software can include software running on the MPIO management station 116, in addition to or in place of software running on the individual host devices 102.

Additional components not explicitly shown in the figure, such as one or more storage caches, may also be provided in the storage array 105 for use in processing IO operations.

For example, in some embodiments, each of the storage controllers 120 has a different local cache or a different allocated portion of a global cache associated therewith, although numerous alternative arrangements are possible. The storage controllers 120 can be implemented as respective storage processors, directors or other storage system components configured to control storage system operations relating to processing of IO operations.

The storage array 105 via its storage controllers 120, SLO-based queues 121 and write pressure information 122 is illustratively configured to detect a write pressure condition by identifying at least a first set of one or more logical storage devices having a first SLO for which at least one performance metric has a value that exceeds a specified threshold, and responsive to the detected write pressure condition, to identify at least a second set of one or more logical storage devices, having a second SLO that is lower than the first SLO, and that are contributing to the detected write pressure condition.

The storage array 105 is further configured, for each of the identified logical storage devices of the second set, to provide a write pressure indication to control throttling of write operations directed to that logical storage device of the second set.

In some embodiments, the write pressure indication is provided by the storage array 105 to at least one of the MPIO drivers 112 of the host devices 102. For example, the MPIO driver 112-1 is illustratively configured, responsive to a write pressure indication received from the storage array 105, to at least temporarily reduce a rate at which the write operations are sent to a corresponding logical storage device of the second set. Other MPIO drivers 112 on other host devices 102 are configured in a similar manner to provide automated write throttling responsive to write pressure indications received from the storage array 105.

In some embodiments, the first SLO illustratively comprises a highest one of a plurality of SLOs supported by the storage array 105, and the second SLO illustratively comprises a lowest one of a plurality of SLOs supported by the storage array 105. With reference to the previous example in which there are four different SLOs denoted Diamond, Gold, Silver and Bronze, the first SLO could be the Diamond SLO and the second SLO could be the Bronze SLO. It is to be appreciated that these and other particular SLOs referred to herein are only examples, and numerous other types and arrangements of SLOs can be used in other embodiments, with a wide variety of different naming conventions.

The performance metric in some embodiments comprises a response time metric for IO operations directed to the first set of one or more logical storage devices, although additional or alternative performance metrics can be used.

In some embodiments, identifying at least a second set of one or more logical storage devices comprises monitoring at least one of a write count, a write pending count and a bandwidth consumption for each of a plurality of logical storage devices having the second SLO, and responsive to detection of an above-threshold amount of increase in at least one of the write count, the write pending count and the bandwidth consumption for a given one of the logical storage device having the second SLO, including the given logical storage device in the second set.

Additionally or alternatively, in some embodiments, for each of the identified logical storage devices of the second set, providing a write pressure indication to control throttling of write operations directed to that logical storage device of the second set comprises receiving from a given one of the host device 102, illustratively host device 102-1, a write operation directed to the logical storage device of the second set, and issuing a check condition notification for the received write operation to the host device 102-1.

For example, issuing the check condition notification illustratively comprises issuing the check condition notification in conjunction with rejecting the received write operation. In some embodiments of this type, multiple write operations are received for the logical storage device of the second set, and rejecting the received write operation comprises selecting a particular one of the multiple write operations to reject based at least in part on an amount of data associated with that write operation.

As indicated previously, the check condition notification in some embodiments causes the MPIO driver 112-1 of the host device 102-1 to at least temporarily reduce a rate at which write operations are directed to the logical storage device of the second set.

For example, at least temporarily reducing a rate at which the write operations are directed to the logical storage device of the second set illustratively comprises reducing the rate for a throttle-down period. In addition, in conjunction with completion of the throttle-down period, a determination is made as to whether or not an additional check condition notification is received responsive to an additional write operation directed to the logical storage device of the second set, and the rate reduction continues responsive to receipt of the additional check condition notification.

Such functions are illustratively performed by the MPIO driver 112-1 of the host device 102-1, utilizing its write throttling logic 115-1 in cooperation with its path selection logic 114-1, although other arrangements are possible. For example, these and other functions referred to herein as being performed by an MPIO driver can in other embodiments be performed at least in part by other host device components.

In some embodiments, the storage array 105 is further configured to receive, in response to the check condition notification issued for a given logical storage device of the second set, a command requesting additional write pressure information for that logical storage device, and to provide, in response to the received command, an indication of a particular level of write pressure currently being experienced. For example, such a command can be issued by the MPIO driver 112-1 of the host device 102-1.

The above-noted command in some embodiments comprises at least one predetermined vendor unique or VU command of a storage access protocol which the host device 102-1 utilizes to communicate with the storage array 105, such as a SCSI or NVMe protocol. A wide variety of different arrangements of commands may be used, as well as numerous associated timing techniques for repeatedly sending such commands from the host device 102-1 to the storage array 105. A "command" as the term is broadly used herein can comprise a combination of multiple distinct commands, such as respective different commands for different ones of a plurality of logical storage devices. Separate commands are utilized in some embodiments to obtain write pressure information for respective logical storage devices. In other embodiments, a single command can be sent to obtain write pressure information for multiple logical storage devices. These and other references herein to sending a command from a host device to a storage array, to obtain additional write pressure information for one or more logical storage devices, are intended to be broadly construed.

Additionally or alternatively, the storage array 105 in some embodiments is further configured to determine that the detected write pressure condition continues to persist subsequent to providing, for each of the identified logical storage devices of the second set, the write pressure indication to control throttling of write operations directed to that logical storage device of the second set. Responsive to this determination, the storage array 105 is further configured to identify at least a third set of one or more logical storage devices having a third SLO that is lower than the first SLO but higher than the second SLO and that are contributing to the detected write pressure condition, and for each of the identified logical storage devices of the third set, to provide a write pressure indication to control throttling of write operations directed to that logical storage device of the third set.

The storage array 105 can perform other additional or alternative functionality relating to automated write throttling. For example, in one or more illustrative embodiments, the storage array 105 is illustratively further configured to track a write pending diminish rate over multiple received write operations, and to delay providing the write pressure indication responsive to a given write operation by an amount of time that is determined based at least in part on a current value of the write pending diminish rate.

Figure 2:
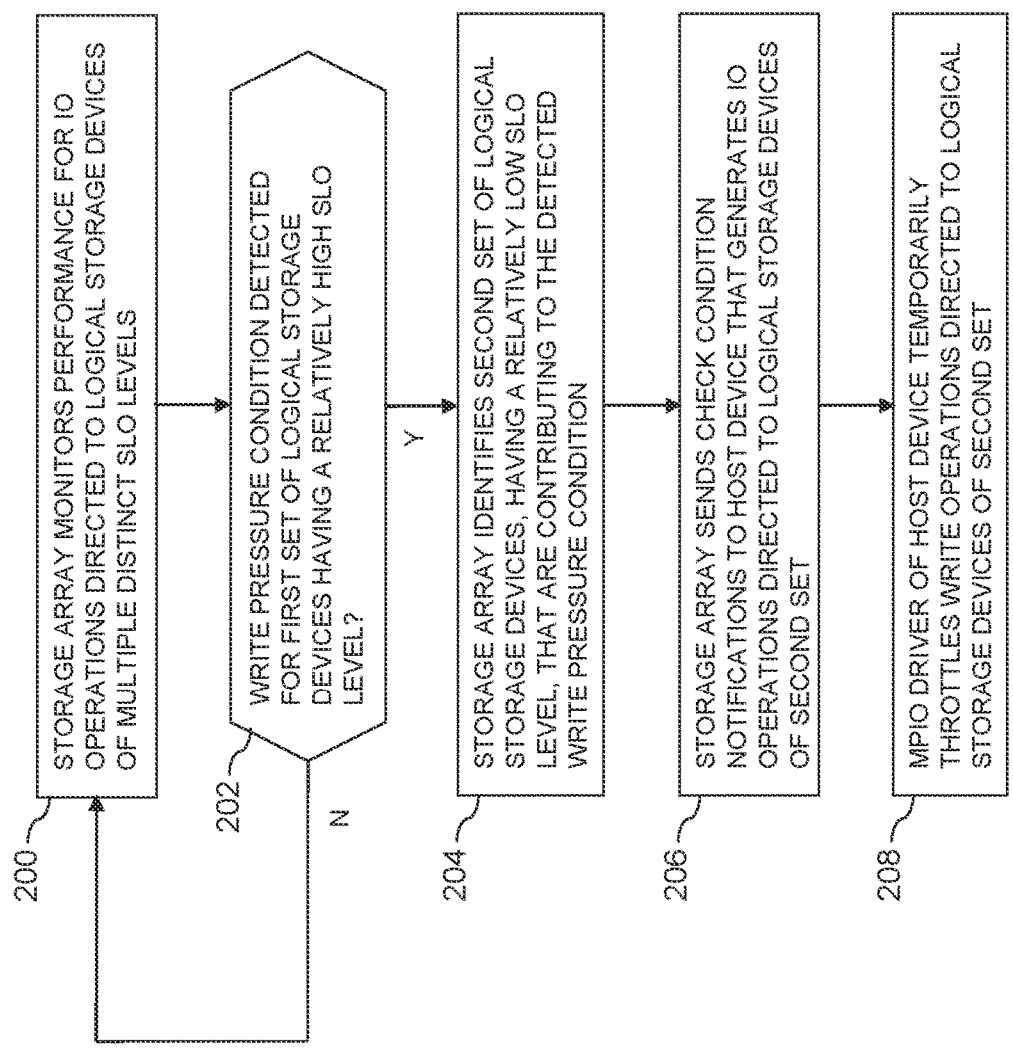
FIG. 2 is a flow diagram of a process for automated write throttling in a multi-path layer of a host device in an illustrative embodiment.

An example of a process including the above-described functionality is illustrated in the flow diagram of FIG. 2.

An example of a set of write pressure information 122 maintained by the storage array 105 for respective LUNs or other logical storage devices is illustrated in FIG. 4. It is assumed that the storage array 105 maintains similar write pressure information for each of at least a subset of the logical storage devices of the storage array 105.

For example, the write pressure information 122 maintained by the storage array 105 can include information indicating whether or not particular logical storage devices of the storage array 105 have each reached a specified percentage (e.g., 80%) of a designated write pending limit for that storage device. This is one example of a type of write pressure condition that can be detected in the storage array 105. Other types of write pressure conditions can be detected in the storage array 105 using other techniques, and the term "write pressure condition" as used herein is therefore intended to be broadly construed.

In some embodiments, the write pressure indication provided by the storage array 105 to one or more of the host devices 102 illustratively comprises a check condition ("chk_cond") indicator. However, this is only an example, and a wide variety of other types of write pressure indications can be provided by the storage array 105 in response to detected write pressure conditions.

As noted above, in some embodiments, write pressure information is obtained directly by the host device 102-1 from storage array 105. Such an arrangement illustratively utilizes an in-band communication mechanism in which one or more commands in a designated storage protocol are sent from the host device 102-1 to the storage array 105.

It is possible in other embodiments that write pressure information can be obtained by the host device 102-1 indirectly from the storage array 105 utilizing an out-of-band communication mechanism via at least one intermediary device. An intermediary device in such an embodiment illustratively comprises the MPIO management station 116 of system 100. The MPIO management station 116 can comprise a server configured to obtain the write pressure information directly from the storage array 105. The MPIO management station 116 is illustratively connected directly to the storage array 105 using protocols such as SCSI, Internet SCSI (iSCSI), FC, NVMeoFC and/or others.

The MPIO driver 112-1 on the host device 102-1 illustratively has connectivity to the MPIO management station 116. The MPIO management station 116 in some embodiments implements PowerPath® Management Appliance (PPMA) functionality to obtain access to the storage array 105. The MPIO driver 112-1 can obtain from the MPIO management station 116 certain types of storage array related information for use in various operations performed at least in part by the MPIO driver 112-1, in addition to or in place of obtaining such information directly from the storage array 105. Host multi-pathing software can be used to implement a multi-path layer comprising MPIO drivers 112 of respective host devices 102 as well as related management appliance software such as the above-noted PPMA of MPIO management station 116. Such host multi-pathing software can be configured to obtain write pressure information or other types of information to facilitate automated write throttling for one or more host devices as disclosed herein.

As indicated previously, conventional approaches to write throttling are problematic, in that a storage array or other storage system may rely excessively on issuance of queue-full indicators to host devices.

For example, many applications today run in-memory, and destage the cached changes in batches which produce write bursts. To handle such write bursts under conventional practice, the storage array needs to be sized for bandwidth and CPU resources that may be far beyond those required in steady state operation. Often such write bursts overload the storage array and thus the writes are cached and held in the storage array until the storage array has sufficient bandwidth and CPU resources available to process them.

Write bursts in these and other situations can cause the storage system to frequently signal queue-full conditions back to the host devices, which can adversely impact the performance of the host devices.

A given storage array typically handles IO operations from many hosts, which means that the internal resources of the storage array are divided between the hosts. When one host creates an IO burst, many storage array resources are diverted to handle this host, and thus one or more other hosts may be adversely impacted. For example, a host may fill the storage array front end IO queue with IOs. The storage array may either dedicate too many queue entries for that host, thus starving one or more other hosts, or report a queue-full condition which adversely impacts the overall performance of the host. The queue-full condition is common to both read pressure and write pressure, and provides the host with very limited information. Also, such queue-full conditions are high impact conditions, and performance suffers if queue-full conditions are reported too frequently.

Each of the hosts usually has a queue capacity that is far larger than the queue capacity that the storage array has for that host. Therefore, it would generally be better for the host to avoid sending more commands to the storage array than sending those commands and having the storage array queue the commands.

For example, in some embodiments herein, each of the host devices 102 has a corresponding set of IO queues 110 for storing IO operations to be delivered to the storage array 105, where a total capacity of the IO queues of the host device is greater than that of an allocated portion of a total IO queue capacity of the storage array 105 that is allocated by the storage array 105 to the host device.

Illustrative embodiments overcome these and other drawbacks of conventional practice by providing a feedback mechanism between the storage array 105 and the host device 102-1, and similarly for other ones of the host devices 102, that informs the host device 102-1 of such IO capacity issues in the storage array 105, such that the host can effectively mitigate the load on the storage array 105.

For example, some embodiments configure host devices 102 to include functionality for automated write throttling using write pressure information obtained from a storage array or other storage system, so as to advantageously avoid the complications of conventional approaches that rely excessively on transmission of queue-full indicators to host devices in the presence of write pressure.

Moreover, as indicated above, storage array 105 in some embodiments implements different types of processing for different SLOs to differentiate between the various service levels that customers require. For example, service levels in a given embodiment may be defined as Diamond, Gold, Silver, Bronze, etc., although as noted above numerous other types and arrangements of SLOs can be used in other embodiments.

Such SLOs are illustratively assigned on a per-device basis, where the devices comprise respective logical storage volumes or other types of logical storage devices, although other arrangements are possible. A LUN or logical unit as that term is used herein is an example of a type of logical storage device, also referred to herein as simply a "device."

The storage array 105 implements such SLOs using various methods such as data placement on storage drives of different types, possibly in different storage tiers, and/or using selective IO handling on its front end. In a more particular example of an approach of the latter type, if the storage array detects that response times for IOs with an assigned SLO of Diamond are too high, the storage array illustratively addresses such a condition by delaying the starting of execution for IOs for devices with an assigned SLO of Bronze.

Conventional approaches involving storage array implementation of SLOs generally do not distinguish between different types of IO operations, such as read ("RD") and write ("WR") operations. Moreover, these conventional approaches generally cannot take into account IO operations that are already executing in the storage array, but instead only adjust the start of execution for incoming IO operations.

Illustrative embodiments also overcome these and other drawbacks of conventional practice by providing a feedback mechanism between the storage array and the host that leverages the SLO functionality of the storage array and an MPIO driver or other multi-pathing software of the host for write pressure avoidance.

A detailed example of an algorithm performed by the storage array 105 ("array") and the MPIO driver 112-1 of a given one of the host devices 102-1, utilizing write throttling logic 115-1, illustratively includes the following steps:

1. The array detects write pressure conditions under which the array slows down due to excessive consumption of array resources. For example, the array can detect such write pressure conditions by monitoring the response time (RT) of IOs directed to devices of one or more higher SLOs. If the RT for higher SLOs (e.g., Diamond/Gold as compared to Silver/Bronze) is below a defined threshold (e.g., defined by SLO RT goals) then the array is not loaded. If the RT for higher SLOs is at or above the SLO threshold then the array is loaded, and the algorithm proceeds to lower the array load.

2. The array identifies the devices of one or more lower SLOs that are contributing to the array load, by regularly monitoring the IO operations (e.g., RD/WR counts, RT, etc.) on all devices. The array regularly monitors each device (or a group of devices comprising a storage group) for performance and also maintains a performance history (e.g., similar to that used to generate performance graphs in a graphical representation of performance data, such as in the Unisphere product from Dell Technologies). Hence the array is capable of discovering when devices with lower SLOs have higher WR counts and/or processing bandwidth consumption than they had previously. These devices are identified by the array as the lower SLO devices that are most likely to be contributing to the array load.

3. The MPIO driver reads the SLO of each device that its host is using and thereby becomes aware of the performance goal of each device. Again, the term "device" as used in the context of the present algorithm refers to a LUN or other logical storage volume or logical storage device of the array.

4. The array determines if IOs to lower SLO devices consume too many array resources, illustratively by detecting higher SLO devices with an RT increase above the threshold and an increase in the lower SLOs WR count, bandwidth consumption and/or WR pending ("WR_Pending") count, where the latter denotes a count of WR commands that were received by the array but not yet destaged for various reasons. Responsive to such a detected condition, the array will reject these IOs with a designated vendor unique (VU) check condition ("chk_cond") notification to the host. Since WR commands consume far more array resources than RD commands (e.g., data destage consumes WR buffer space until destaged, partial array-block-size WR requires RD-modify-WR, etc.), the array will first reject the WR commands to devices with lower SLOs. Only if the pressure continues will the array start rejecting RD commands, again with a designated VU chk_cond notification.

5. The MPIO driver, upon detecting the chk_cond notification returned from the array, will delay sending further IOs to the corresponding device for a certain amount of time (e.g., X=4 seconds, although a wide variety of other delay time values could be used), and will gradually restore normal IO after the delay time has elapsed (e.g., send a command to the device and determine if the chk_cond notification is still being returned by the array responsive to the command).

6. In host devices having certain types of operating systems, the MPIO driver resides above the SCSI driver and thus doesn't directly receive the chk_cond notification from the array, but instead just receives an indication via the SCSI driver that the IO has failed. For host devices that have such operating systems, the MPIO driver, following receipt of an indication of an IO failure, sends a designated VU command to the array to obtain the reason for the failed IO. For example, the MPIO can receive from the array in response to the designated VU command a code indicating particular level of write pressure currently being experienced by the array. Such information can be specified, at least in part, in the form of indicated write delays.

7. When such write pressure conditions are detected by the array, IOs to devices with the lowest SLOs will be rejected by the array first, and if the higher SLO RT is not reduced as a result, IOs to higher SLOs will start getting rejected by the array. For example, if Diamond IO RT does not meet the goal, the array starts by rejecting IOs to Bronze SLO devices. If this adjustment does not make the Diamond SLO IOs go back into compliance, the array also starts rejecting IOs to Silver SLO devices, and so on.

8. Another rejection criterion that is used for lower SLO IOs in some embodiments is IO length, as longer IOs generally require more array resources, where "length" in this example refers to the amount of data associated with the IO. Thus, if the higher SLO RT goal is not met, the array will start by rejecting the longer IOs sent to lower SLO devices. Shorter IOs to the lower SLO devices may not be rejected at first. Then, if needed, also reject the shorter IOs to the lower SLO devices.

9. The array returning the chk_cond notification, or similar notifications in the case of other protocols such as iSCSI and NVMeF, means that the rejected IOs for the corresponding device will be accumulating in the host queues while the host delays sending them to the array. Some host operating systems (e.g., ESX) may be sensitive to such extended queue wait times at the host. In order to lower the required queueing at the host in some embodiments, the array does not return the chk_cond notification immediately, but instead first queues the commands at the array for a designated time period (e.g., Y=100 msec, although a wide variety of other queuing time values could be used) and only after expiration of that time period returns the chk_cond notification to the host. Such an arrangement allows some of the queueing to be done in the array. The amount of delay time in responding with the chk_cond notification can be computed in inverse proportion to the WR_Pending diminish rate, where the WR_Pending count is indicated by the number of array WR buffers that are full. Thus, the faster the array destages WR data, the lower the computed delay time.

10. Since the MPIO driver is aware of the SLO value for each device, the MPIO driver can also schedule Diamond IOs before Gold, Silver and/or Bronze IOs, in cases in which congestion is reported by the array.

This particular algorithm is presented by way of illustrative example only, and other embodiments can use other types of algorithms with additional or alternative steps to provide the disclosed functionality. For example, certain steps illustrated as being performed serially can instead be performed at least in part in parallel with one another. The particular steps of the above-described example algorithm, and other algorithms disclosed herein, are illustrative only, and should not be considered limiting in any way.

Such an algorithm in some embodiments is implemented by cooperative interaction of storage controllers 120 of storage array 105 and instances of write throttling logic 115 of MPIO drivers 112 of host devices 102.

Illustrative embodiments provide significant advantages over conventional practice. For example, these embodiments provide an efficient algorithm for write pressure avoidance that leverages SLO information in a storage array and write throttling logic in an MPIO driver.

These and other embodiments avoid write pressure that can arise in cases of database memory flush, and in a wide variety of other contexts. As a result, IO processing performance is improved, and the system can more easily meet the performance goals of the different levels of SLOs.

In addition, some embodiments avoid the negative host performance implications of excessive signaling of queue-full conditions in a storage array.

The portions of the example techniques described above as being performed by a given MPIO driver 112-1 on a corresponding host device 102-1 can be similarly performed by other MPIO drivers 112 on respective other host devices 102. Such MPIO drivers 112 illustratively form a multi-path layer comprising multi-pathing software of the host devices. Other types of host drivers can be used in other embodiments. For example, in some embodiments, at least a portion of the disclosed automated write throttling functionality is carried out using one or more iSCSI drivers, or other types of non-MPIO host drivers.

Additional examples of automated write throttling arrangements will be described elsewhere herein in conjunction with the embodiments of FIGS. 2 through 4. Other types of automated write throttling arrangements can be used in other embodiments.

These and other functions related to automated write throttling that are referred to herein as being performed by or under the control of the MPIO driver 112-1 can in some embodiments be performed at least in part outside of the MPIO driver 112-1, such as in the host device 102-1 generally.

The above-described functions associated with automated write throttling in the MPIO driver 112-1 in some embodiments are carried out at least in part under the control of its write throttling logic 115-1, illustratively operating in cooperation with path selection logic 114-1. For example, the write throttling logic 115-1 is illustratively configured to control performance of one or more steps of the process in the flow diagram to be described below in conjunction with FIG. 2. In other embodiments, one or more such steps can be more generally performed by the host device 102-1.

It is assumed that each of the other MPIO drivers 112 is configured in a manner similar to that described above and elsewhere herein for the first MPIO driver 112-1. The other host devices 102 of the system 100 are therefore also configured to communicate over the SAN 104 with the storage array 105. The MPIO drivers 112 of such other host devices are each similarly configured to deliver IO operations from its corresponding one of the sets of IO queues 110 to the storage array 105 over selected paths through the SAN 104, and to perform the disclosed functionality for automated write throttling.

Accordingly, functionality described above in the context of the first MPIO driver 112-1 and the first host device 102-1 is assumed to be similarly performed by each of the other MPIO drivers 112-2 through 112-N and/or more generally by their respective host devices 102-2 through 102-N.

The MPIO drivers 112 may be otherwise configured utilizing well-known MPIO functionality. Such conventional MPIO functionality is suitably modified in illustrative embodiments disclosed herein to support automated write throttling.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF.

The storage array 105 in the present embodiment is assumed to comprise a persistent memory that is implemented using a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays, or may be implemented in whole or in part using other types of non-volatile memory.

As mentioned above, communications between the host devices 102 and the storage array 105 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage array 105 in some embodiments may be implemented as part of cloud infrastructure in the form of a cloud-based system such as an Amazon Web Services (AWS) system. Other examples of cloud-based systems that can be used to provide at least portions of the storage array 105 and possibly other portions of system 100 include Google Cloud Platform (GCP) and Microsoft Azure.

The storage devices 106 of the storage arrays 105 can be implemented using solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 106.

The storage array 105 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array. For example, the storage array 105 may comprise one or more storage arrays such as one or more VNX®, VMAX®, Unity™ or PowerMax™ storage arrays, commercially available from Dell EMC.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

It is to be appreciated that these and other features of illustrative embodiments are presented by way of example only, and should not be construed as limiting in any way. Accordingly, different numbers, types and arrangements of system components such as host devices 102, SAN 104, storage array 105, storage devices 106, sets of IO queues 110, and WIPIO drivers 112, including their corresponding instances of path selection logic 114 and write throttling logic 115, can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of the illustrative embodiment of FIG. 2. The process as shown includes steps 200 through 208, and is suitable for use in the system 100 but is more generally applicable to other types of systems comprising at least one host device and a storage system. The storage system in this embodiment is assumed to comprise at least one storage array having a plurality of storage devices. The storage devices can include logical storage devices such as LUNs or other logical storage volumes.

The steps of the FIG. 2 process are illustratively performed at least in part by or under the control of a storage array, operating in conjunction with an MPIO driver of a given host device. For example, portions of the process may be carried out under the control of software, firmware and/or hardware of an instance of write throttling logic deployed within the MPIO driver. Accordingly, the FIG. 2 process may be viewed as an example of an algorithm performed in part by the write throttling logic 115-1 of the MPIO driver 112-1 of host device 102-1, through interaction with storage array 105. Other arrangements of storage array components, host device components and/or other system components can be configured to perform at least portions of one or more of the steps in other embodiments.

In step 200, the storage array monitors performance for IO operations directed to logical storage devices of multiple distinct SLO levels. As noted above, example SLO levels include Diamond, Gold, Silver and Bronze, illustratively ordered from high to low in terms of response time objective or other type of SLO, although a wide variety of other types of SLO levels and associated performance metrics are possible.

In step 202, a determination is made as to whether or not a write pressure condition is detected for a first set of logical storage devices having a relatively high SLO level. If such a write pressure condition is not detected, the process returns to step 200 to continue monitoring performance for IO operations directed to logical storage devices of multiple distinct SLO levels, and otherwise moves to step 204 as shown.

In step 204, which is reached if a write pressure condition is detected for a first set of logical storage devices having a relatively high SLO level, the storage array identifies a second set of logical storage devices, having a relatively low SLO level, that are contributing to the detected write pressure condition.

In step 206, the storage array sends check condition notifications to a host device that generates IO operations directed to the logical storage devices of the second set.

In step 208, the MPIO driver of the host device temporarily throttles write operations directed to the logical storage devices of the second set. Such write pressure throttling by the MPIO driver of the host device illustratively continues until the write pressure condition impacting the first set of logical storage devices having the relatively high SLO level is sufficiently alleviated. For example, the MPIO driver can reduce the rate at which write operations are sent to the logical storage devices of the second set for one or more throttle-down periods until such time that the previously-detected write pressure condition no longer exists.

Multiple additional instances of the FIG. 2 process may be performed for respective additional host devices that share the storage array. Other embodiments can include multiple storage arrays, with the disclosed functionality for automated write throttling being implemented for each of those storage arrays.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and functionality for automated write throttling. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different automated write throttling arrangements within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 3:
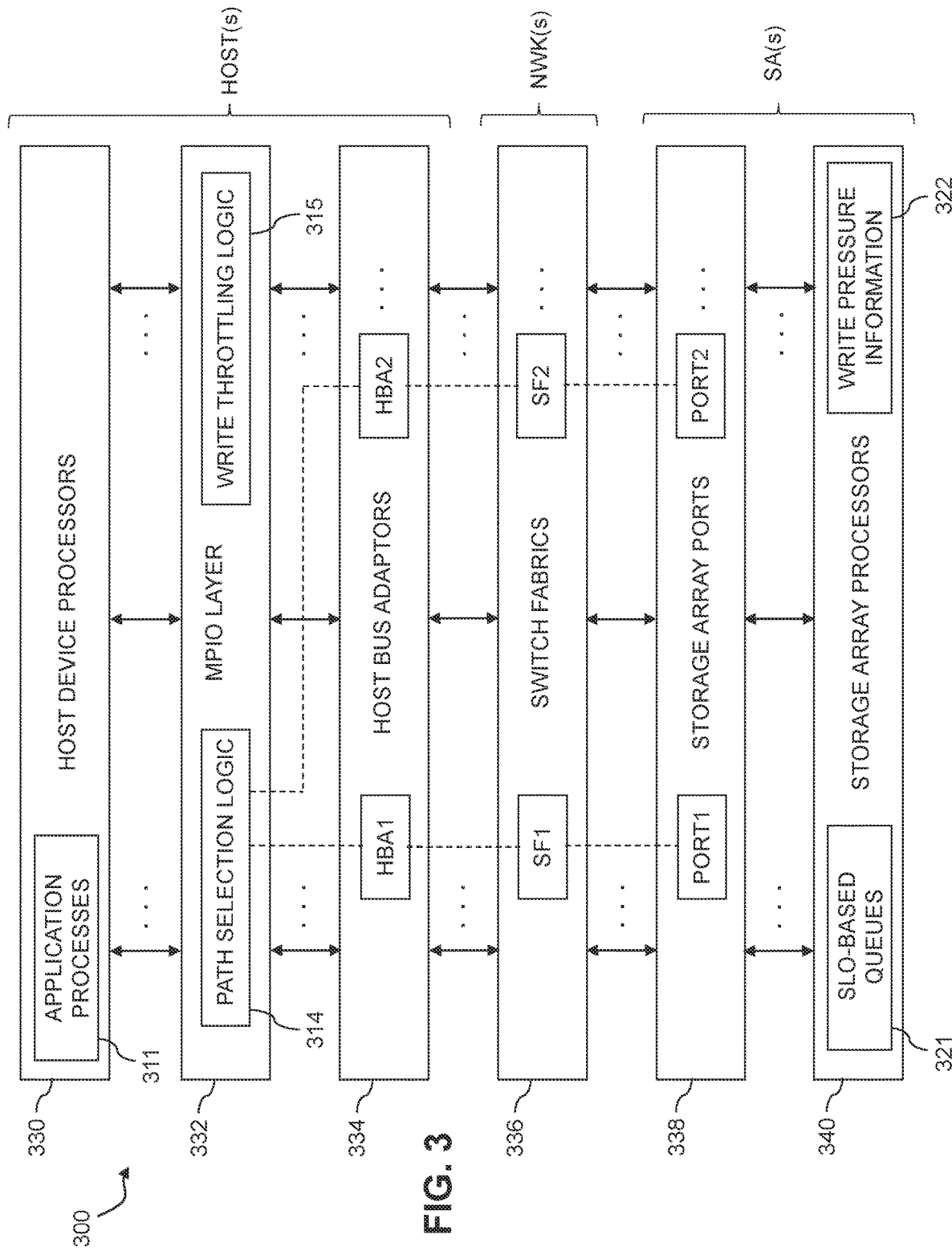
FIG. 3 is a block diagram showing multiple layers of a layered system architecture that includes a multi-path layer with functionality for automated write throttling in an illustrative embodiment.

Referring now to FIG. 3, another illustrative embodiment is shown. In this embodiment, an information processing system 300 comprises host-side elements that include application processes 311, path selection logic 314 and write throttling logic 315, and storage-side elements that include SLO-based queues 321 and write pressure information 322. There may be separate instances of one or more such elements associated with each of a plurality of system components such as host devices and storage arrays of the system 300. In a manner similar to that described elsewhere herein, the write pressure information 322 is determined based at least in part on performance measurements for IO operations associated with the SLO-based queues 321 in one or more storage arrays, and is obtainable by one or more host devices via their respective MPIO drivers and utilized by the write throttling logic 315 to control rates at which write operations are sent to particular logical storage devices of the one or more storage arrays over paths selected by the path selection logic 314.

The system 300 is configured in accordance with a layered system architecture that illustratively includes a host device processor layer 330, an MPIO layer 332, an HBA layer 334, a switch fabric layer 336, a storage array port layer 338 and a storage array processor layer 340. The host device processor layer 330, the MPIO layer 332 and the HBA layer 334 are associated with one or more host devices, the switch fabric layer 336 is associated with one or more SANs or other types of networks, and the storage array port layer 338 and storage array processor layer 340 are associated with one or more storage arrays ("SAs").

The system 300 in this embodiment implements automated write throttling utilizing one or more MPIO drivers of the MPIO layer 332, and associated instances of write throttling logic 315. The application processes 311 generate IO operations that are processed by the MPIO layer 332 for delivery to the one or more storage arrays. Paths are determined by the path selection logic 314 for sending such IO operations to the one or more storage arrays. These IO operations include write operations that are illustratively subject to write throttling in write throttling logic 315 based at least in part on write pressure information obtained by the MPIO driver for respective logical storage devices. The write throttling logic 315 operates in cooperation with the path selection logic 314 in one or more MPIO drivers of the MPIO layer 332 to perform automated write throttling in the manner disclosed herein.

The MPIO layer 332 is an example of what is also referred to herein as a multi-path layer, and comprises one or more MPIO drivers implemented in respective host devices. Each such MPIO driver illustratively comprises respective instances of path selection logic 314 and write throttling logic 315 configured as previously described. Additional or alternative layers and logic arrangements can be used in other embodiments.

In the system 300, path selection logic 314 is configured to select different paths for sending IO operations from a given host device to a storage array. These paths as illustrated in the figure include a first path from a particular HBA denoted HBA1 through a particular switch fabric denoted SF1 to a particular storage array port denoted PORT1, and a second path from another particular HBA denoted HBA2 through another particular switch fabric denoted SF2 to another particular storage array port denoted PORT2.

These two particular paths are shown by way of illustrative example only, and in many practical implementations there will typically be a much larger number of paths between the one or more host devices and the one or more storage arrays, depending upon the specific system configuration and its deployed numbers of HBAs, switch fabrics and storage array ports. For example, each host device in the FIG. 3 embodiment can illustratively have a set of n paths to a shared storage array, or alternatively different ones of the host devices can have different numbers and types of paths to the storage array.

The path selection logic 314 of the MPIO layer 332 in this embodiment selects paths for delivery of IO operations to the one or more storage arrays having the storage array ports of the storage array port layer 338. More particularly, the path selection logic 314 determines appropriate paths over which to send particular IO operations to particular logical storage devices of the one or more storage arrays.

It is assumed in this embodiment that the host devices through their respective MPIO drivers and respective instances of write throttling logic 315 provide functionality for automated write throttling, illustratively with involvement of other host device components such as the path selection logic 314.

Some implementations of the system 300 can include a relatively large number of host devices (e.g., 1000 or more host devices), although as indicated previously different numbers of host devices, and possibly only a single host device, may be present in other embodiments. Each of the host devices is typically allocated with a sufficient number of HBAs to accommodate predicted performance needs. In some cases, the number of HBAs per host device is on the order of 4, 8 or 16 HBAs, although other numbers of HBAs could be allocated to each host device depending upon the predicted performance needs. A typical storage array may include on the order of 128 ports, although again other numbers can be used based on the particular needs of the implementation. The number of host devices per storage array port in some cases can be on the order of 10 host devices per port. The HBAs of the host devices are assumed to be zoned and masked to the storage array ports in accordance with the predicted performance needs, including user load predictions.

A given host device of system 300 can be configured to initiate an automated path discovery process to discover new paths responsive to updated zoning and masking or other types of storage system reconfigurations performed by a storage administrator or other user. For certain types of host devices, such as host devices using particular operating systems such as Windows, ESX or Linux, automated path discovery via the MPIO drivers of a multi-path layer is typically supported. Other types of host devices using other operating systems such as AIX in some implementations do not necessarily support such automated path discovery, in which case alternative techniques can be used to discover paths.

Additional illustrative embodiments will now be described. It is assumed in these embodiments that the MPIO driver of a given host device provides at least portions of the disclosed automated write throttling functionality, possibly with involvement of one or more other host device components.

Referring now to FIG. 4, an example of a set of write pressure information 400 maintained by a storage system such as storage array 105 is shown. The write pressure information 400 is illustratively maintained by the storage array 105 for particular LUNs that are denoted LUN 1, LUN 2, . . . LUN X in the figure. These LUNs may comprise all of the LUNs of the storage array 105, or a designated subset of the LUNs of the storage array 105. Different sets of write pressure information similar to write pressure information 400 may be maintained for respective different sets of LUNs of the storage array 105. The write pressure information 400 may be viewed as one possible example of write pressure information 122 of storage array 105 in the FIG. 1 embodiment. Similar write pressure information may be utilized as write pressure information 322 in the FIG. 3 embodiment.

The write pressure information 400 more particularly includes performance measurements for each of the LUNs denoted LUN 1 through LUN X, as well as a corresponding SLO level identifier (ID) as indicated. The performance measurements in some embodiments comprise response time (RT) measurements compiled by the storage array 105 over a designated time period for IO operations directed to the corresponding LUNs. Additional or alternative performance metrics that can be used in generating the performance measurements include, for example, at least one of a write count, a write pending count and a bandwidth consumption for IO operations directed to the corresponding LUNs.

The write pressure information 400 is utilized in conjunction with SLO-based queues 121 of the storage array 105 in detecting write pressure conditions and implementing associated automated write throttling as disclosed herein.

The particular write pressure information arrangement shown in FIG. 4 is only an example, and numerous other types and arrangements of write pressure information can be maintained by a storage system in other embodiments. Terms such as "write pressure information" as used herein are intended to be broadly construed.

As indicated above, the MPIO driver of a given one of the host devices 102 can obtain write pressure information from the storage array 105 by sending commands to the storage array 105, in the manner previously described.

The write pressure information 400 is illustratively stored in a storage array memory accessible to a multi-path layer of the host device. Other types of data structures can be used in other embodiments.

On the host side, at least portions of such write pressure information obtained from the storage array and characterizing one or more logical storage devices are illustratively stored in a data structure of a kernel-space portion of the MPIO driver 112-1, although other storage arrangements with other types of data structures can be used.

In some embodiments, an MPIO driver obtains write pressure information directly from a storage array, through interaction with the storage array as described elsewhere herein. For example, MPIO driver 112-1 is illustratively configured to obtain the write pressure information directly from the storage array 105 utilizing an in-band communication mechanism in which one or more commands in a designated storage protocol are sent from the MPIO driver 112-1 or another host device component to the storage array 105.

However, it is possible in some embodiments that one or more MPIO drivers of one or more host devices can obtain the write pressure information other than through direct communication with the storage array. Such arrangements illustratively involve obtaining the connectivity information indirectly from the storage array utilizing an out-of-band communication mechanism via at least one intermediary device, such as the MPIO management station 116, which may comprise one or more servers.

The above-described processes, algorithms and other features and functionality disclosed herein are presented by way of illustrative example only, and other embodiments can utilize additional or alternative arrangements.

Also, as mentioned previously, different instances of the above-described processes, algorithms and other automated write throttling techniques can be performed by different MPIO drivers in different host devices, or using other types of host drivers, such as, for example, iSCSI drivers.

The particular automated write throttling arrangements described above are therefore presented by way of illustrative example only. Numerous alternative arrangements of these and other features can be used in implementing the automated write throttling in other illustrative embodiments.

As indicated previously, illustrative embodiments disclosed herein can provide a number of significant advantages relative to conventional arrangements.

For example, these embodiments provide an efficient algorithm for write pressure avoidance that leverages SLO information in a storage array to perform automated write throttling in an MPIO driver.

These and other embodiments avoid write pressure that can arise in cases of database memory flush, and in a wide variety of other contexts. As a result, IO processing performance is improved, and the system can more easily meet the performance goals of the different levels of SLOs.

Such embodiments advantageously avoid the complications of conventional approaches that rely excessively on transmission of queue-full indicators to host devices in the presence of write pressure.

Illustrative embodiments can therefore prevent significant degradations in IO processing performance that might otherwise occur if excessive numbers of queue-full indicators were generated by a storage array or other storage system.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™ or Vblock® converged infrastructure from Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, the instances of path selection logic 114 and write throttling logic 115 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, path selection logic, write throttling logic and additional or alternative components. Also, the particular configurations of system and device elements and associated processing operations illustratively shown in the drawings can be varied in other embodiments. For example, a wide variety of different host device configurations and associated automated write throttling arrangements can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
   at least one processing device comprising a processor coupled to a memory;
   where the at least one processing device is configured:
   to detect a write pressure condition by identifying at least a first set of one or more logical storage devices having a first service level objective for which at least one performance metric has a value that exceeds a specified threshold;
   responsive to the detected write pressure condition, to identify at least a second set of one or more logical storage devices, having a second service level objective that is lower than the first service level objective, and that are contributing to the detected write pressure condition; and
   for each of the identified logical storage devices of the second set, to provide a write pressure indication to control throttling of write operations directed to that logical storage device of the second set.

2. The apparatus of claim 1 wherein the at least one processing device is implemented in a storage system that includes the first and second sets of logical storage devices.

3. The apparatus of claim 2 wherein the first service level objective comprises a highest one of a plurality of service level objectives supported by the storage system.

4. The apparatus of claim 2 wherein the second service level objective comprises a lowest one of a plurality of service level objectives supported by the storage system.

5. The apparatus of claim 1 wherein the performance metric comprises a response time metric for input-output operations directed to the first set of one or more logical storage devices.

6. The apparatus of claim 1 wherein identifying at least a second set of one or more logical storage devices comprises:
   monitoring at least one of a write count, a write pending count and a bandwidth consumption for each of a plurality of logical storage devices having the second service level objective; and
   responsive to detection of an above-threshold amount of increase in at least one of the write count, the write pending count and the bandwidth consumption for a given one of the logical storage device having the second service level objective, including the given logical storage device in the second set.

7. The apparatus of claim 1 wherein, for each of the identified logical storage devices of the second set, providing a write pressure indication to control throttling of write operations directed to that logical storage device of the second set comprises:
   receiving from a host device a write operation directed to the logical storage device of the second set; and
   issuing a check condition notification for the received write operation to the host device.

8. The apparatus of claim 7 wherein issuing the check condition notification comprises issuing the check condition notification in conjunction with rejecting the received write operation.

9. The apparatus of claim 8 wherein multiple write operations are received for the logical storage device of the second set, and rejecting the received write operation comprises selecting a particular one of the multiple write operations to reject based at least in part on an amount of data associated with that write operation.

10. The apparatus of claim 7 wherein the check condition notification causes the host device to at least temporarily reduce a rate at which write operations are directed to the logical storage device of the second set.

11. The apparatus of claim 10 wherein at least temporarily reducing a rate at which the write operations are directed to the logical storage device of the second set comprises:
    reducing the rate for a throttle-down period;
    in conjunction with completion of the throttle-down period, determining if an additional check condition notification is received responsive to an additional write operation directed to the logical storage device of the second set; and
    continuing to reduce the rate responsive to receipt of the additional check condition notification.

12. The apparatus of claim 1 wherein the at least one processing device is further configured:
    to receive, in response to a check condition notification issued for a given logical storage device of the second set, a command requesting additional write pressure information for that logical storage device; and
    to provide, in response to the received command, an indication of a particular level of write pressure currently being experienced.

13. The apparatus of claim 1 wherein the at least one processing device is further configured:
    to determine that the detected write pressure condition continues to persist subsequent to providing, for each of the identified logical storage devices of the second set, the write pressure indication to control throttling of write operations directed to that logical storage device of the second set; and
    responsive to the determining, to identify at least a third set of one or more logical storage devices having a third service level objective that is lower than the first service level objective but higher than the second service level objective and that are contributing to the detected write pressure condition; and
    for each of the identified logical storage devices of the third set, to provide a write pressure indication to control throttling of write operations directed to that logical storage device of the third set.

14. The apparatus of claim 1 wherein the at least one processing device is further configured:
    to track a write pending diminish rate over multiple received write operations; and
    to delay providing the write pressure indication responsive to a given write operation by an amount of time that is determined based at least in part on a current value of the write pending diminish rate.

15. A computer program product comprising a non-transitory processor-readable storage medium having stored therein program code of one or more software programs, wherein the program code, when executed by at least one processing device comprising a processor coupled to a memory, causes the processing device:
    to detect a write pressure condition by identifying at least a first set of one or more logical storage devices having a first service level objective for which at least one performance metric has a value that exceeds a specified threshold;

responsive to the detected write pressure condition, to identify at least a second set of one or more logical storage devices, having a second service level objective that is lower than the first service level objective, and that are contributing to the detected write pressure condition; and for each of the identified logical storage devices of the second set, to provide a write pressure indication to control throttling of write operations directed to that logical storage device of the second set.

16. The computer program product of claim 15 wherein identifying at least a second set of one or more logical storage devices comprises:

monitoring at least one of a write count, a write pending count and a bandwidth consumption for each of a plurality of logical storage devices having the second service level objective; and responsive to detection of an above-threshold amount of increase in at least one of the write count, the write pending count and the bandwidth consumption for a given one of the logical storage device having the second service level objective, including the given logical storage device in the second set.

17. The computer program product of claim 15 wherein, for each of the identified logical storage devices of the second set, providing a write pressure indication to control throttling of write operations directed to that logical storage device of the second set comprises:

receiving from a host device a write operation directed to the logical storage device of the second set; and issuing a check condition notification for the received write operation to the host device.

18. A method comprising:

to detect a write pressure condition by identifying at least a first set of one or more logical storage devices having a first service level objective for which at least one performance metric has a value that exceeds a specified threshold;

responsive to the detected write pressure condition, to identify at least a second set of one or more logical storage devices, having a second service level objective that is lower than the first service level objective, and that are contributing to the detected write pressure condition; and for each of the identified logical storage devices of the second set, to provide a write pressure indication to control throttling of write operations directed to that logical storage device of the second set;

wherein the method is performed by at least one processing device comprising a processor coupled to a memory.

19. The method of claim 18 wherein identifying at least a second set of one or more logical storage devices comprises:

monitoring at least one of a write count, a write pending count and a bandwidth consumption for each of a plurality of logical storage devices having the second service level objective; and responsive to detection of an above-threshold amount of increase in at least one of the write count, the write pending count and the bandwidth consumption for a given one of the logical storage device having the second service level objective, including the given logical storage device in the second set.

20. The method of claim 18 wherein, for each of the identified logical storage devices of the second set, providing a write pressure indication to control throttling of write operations directed to that logical storage device of the second set comprises:

receiving from a host device a write operation directed to the logical storage device of the second set; and issuing a check condition notification for the received write operation to the host device.

\* \* \* \* \*